(12) United States Patent
Chiang et al.

(10) Patent No.: US 11,327,268 B2
(45) Date of Patent: May 10, 2022

(54) CAMERA MODULE WITH THERMAL DEFORMABLE MATERIAL

(71) Applicant: Spring Rainbow Optics Co., LTD, Taoyuan (TW)

(72) Inventors: Po-Liang Chiang, Taipei (TW); Yu-Teng Jheng, Changhua County (TW)

(73) Assignee: SPRING RAINBOW OPTICS CO., LTD, Taoyuan (TW)

( * ) Notice: Subject to any disclaimer, the term of this patent is extended or adjusted under 35 U.S.C. 154(b) by 237 days.

(21) Appl. No.: 16/544,219

(22) Filed: Aug. 19, 2019

(65) Prior Publication Data

US 2020/0064581 A1 Feb. 27, 2020

Related U.S. Application Data

(60) Provisional application No. 62/720,608, filed on Aug. 21, 2018.

(51) Int. Cl.
*G02B 7/02* (2021.01)
(52) U.S. Cl.
CPC .............. *G02B 7/021* (2013.01); *G02B 7/025* (2013.01)
(58) Field of Classification Search
CPC ................................ G02B 7/021; G02B 7/025
USPC ......................................................... 359/820
See application file for complete search history.

(56) References Cited

U.S. PATENT DOCUMENTS

| | | | | |
|---|---|---|---|---|
| 2,423,492 A * | 7/1947 | Fairbank | ................ | G02B 7/022 359/820 |
| 3,205,774 A * | 9/1965 | Estes | ..................... | G02B 7/028 359/789 |
| 5,894,369 A * | 4/1999 | Akiba | .................... | A61B 1/127 359/820 |
| 6,865,034 B1 * | 3/2005 | Willis | ...................... | G01J 1/02 359/820 |
| 2008/0084619 A1 * | 4/2008 | Lee | ......................... | G02B 27/62 359/820 |
| 2017/0176706 A1 * | 6/2017 | Yang | ........................ | G02B 7/026 |
| 2020/0099837 A1 * | 3/2020 | Diesel | ................. | H04N 5/2254 |

OTHER PUBLICATIONS

Van der Vegt, A.K. Polymeren: Van keten tot kunststof. Delft University Press. 1991 http://resolver.tudelft.nl/uuid:9baea5ac-cfe9-409e-8037-da83dac7ee0a (Year: 1991).*

* cited by examiner

*Primary Examiner* — Collin X Beatty
(74) *Attorney, Agent, or Firm* — WPAT, PC

(57) ABSTRACT

A camera module includes a lens assembly, a holder, and a thermal deformable material. The lens assembly includes at least one lens and a lens barrel, wherein the lens barrel includes a wall surrounding a central axis of the lens assembly to define a receiving chamber, and the lens is disposed in the receiving chamber. The holder surrounds the lens barrel and supports the lens assembly. The thermal deformable material is disposed between an outer wall of the lens barrel and an inner wall of the holder.

17 Claims, 4 Drawing Sheets

CAMERA MODULE WITH THERMAL DEFORMABLE MATERIAL

CROSS REFERENCE TO RELATED APPLICATIONS

The present application claims the benefit of priority under 35 USC 119(e) of U.S. Provisional Patent Application No. 62/720,608 entitled "IMAGING MODULE WITH HEAT SHRINKABLE MATERIAL" and filed on Aug. 21, 2018, the contents of which are incorporated herein by reference in their entirety.

FIELD OF INVENTION

The present disclosure relates to the technical field of cameras, and particularly to a camera module including a thermal deformable material.

BACKGROUND OF DISCLOSURE

The lens barrel 1 and the holder 2 in a conventional camera module are often combined in a thread engagement manner 4 as a screw and a nut, as shown in FIG. 1. However, recently, due to need of a focus adjusting process, a lens barrel 5 and a holder 6 are often combined in a threadless manner, as shown in FIG. 2. A small gap 8 is reserved between the lens barrel 5 and the holder 6 for filling glue in order to fixing the combination in the back end of the focus adjusting process.

This threadless combination has two problems. Firstly, the lens barrel 5 and the holder 6 are difficult to transport in combination. Due to the gap, the lens barrel 5 and the holder 6 tend to tremble during the transportation process, unlike the thread type combination, in which the lens barrel 1 and the holder 2 are pre-locked in advance, resulting in labor consumption in the back-end process. Moreover, dust and the like may easily enter the gap 8 between the lens barrel 5 and the holder 6 during the transportation process, resulting in defects in the resultant image. Secondly, after the focus is adjusted, the combination is fixed by glue. However, if the focus adjustment result is not accurate enough, there is no chance of rework, because strong binding of the glue makes the lens barrel 5 and the holder 6 difficult to separate. The high-priced lens barrel 5 and even the image sensor 7 (for example: CMOS or CCD) under the lens barrel 5 are inevitably damaged during the forced disassembling process.

Therefore, it is necessary to provide a camera module for solving the problems of the prior art.

SUMMARY OF INVENTION

A primary object of the present disclosure is to provide a camera module with a thermal deformable material.

To achieve the above object, an aspect of the present disclosure provides a camera module including:
a lens assembly including at least one lens and a lens barrel, wherein the lens barrel includes a wall surrounding a central axis of the lens assembly to define a receiving chamber, and the lens is disposed in the receiving chamber;
a holder surrounding the lens barrel and supporting the lens assembly; and
a thermal deformable material disposed between an outer wall of the lens barrel and an inner wall of the holder.

In accordance with an embodiment of the present disclosure, the thermal deformable material directly contacts the outer wall of the lens barrel and the inner wall of the holder, no space is between the thermal deformable material and the outer wall of the lens barrel, and no space is between the thermal deformable material and the inner wall of the holder.

In accordance with an embodiment of the present disclosure, the camera module further includes glue fixing the holder and the lens barrel.

In accordance with an embodiment of the present disclosure, the thermal deformable material is selected from a group consisting of polyethylene (PE), polyethylene terephthalate (PET), polyvinyl chloride (PVC), polyvinylidene difluoride (PVDF), and rubber.

In accordance with an embodiment of the present disclosure, a distance from the thermal deformable material to an incident end of the lens assembly is defined as a formula:

$$a \geq 0.1L, \qquad \text{Formula 2:}$$

wherein a is the distance from the thermal deformable material to the incident end of the lens assembly, and L is a length of the lens barrel.

In accordance with an embodiment of the present disclosure, a length of the thermal deformable material is defined as a formula:

$$0.9L \geq b \geq 0.1L, \qquad \text{Formula 3:}$$

wherein b is the length of the thermal deformable material, and L is a length of the lens barrel.

In accordance with an embodiment of the present disclosure, a distance is from the thermal deformable material to an emergent end of the lens assembly is defined a formula:

$$0.5L \geq c \geq 0, \qquad \text{Formula 4:}$$

wherein c is the distance is from the thermal deformable material to the emergent end of the lens assembly, and L is a length of the lens barrel.

In accordance with an embodiment of the present disclosure, a cross-section of the lens barrel is a circle, a square, a rectangular, or an irregular shape.

In accordance with an embodiment of the present disclosure, the thermal deformable material is formed into a sleeve or in a tube shape.

To achieve the above object, an aspect of an embodiment of the present disclosure provides a portable device, including the aforementioned camera module.

To achieve the above object, an aspect of an embodiment of the present disclosure provides a smart phone, including the aforementioned camera module.

To achieve the above object, an aspect of an embodiment of the present disclosure provides a method for assembling a camera module, including:
a step 10 of placing a thermal deformable material around a lens barrel of a lens assembly;
a step 20 of heating the thermal deformable material, such that the thermal deformable material shrinks and wraps around the lens barrel, and directly contacts the lens barrel; and
a step 30 of inserting the lens barrel into a cavity of a holder.

In accordance with an embodiment of the present disclosure, after the step 20 of heating the thermal deformable material, the thermal deformable material directly contacts the outer wall of the lens barrel, and no space is between the thermal deformable material and the outer wall of the lens barrel; and after the step 30 of inserting the lens barrel into the cavity of the holder, the thermal deformable material directly contacts an inner wall of the holder, and no space is between the thermal deformable material and the inner wall of the holder.

In accordance with an embodiment of the present disclosure, the method further includes a step 40 of dispensing glue between the holder and the thermal deformable material.

In accordance with an embodiment of the present disclosure, the thermal deformable material is selected from a group consisting of polyethylene (PE), polyethylene terephthalate (PET), polyvinyl chloride (PVC), polyvinylidene difluoride (PVDF), and rubber.

In accordance with an embodiment of the present disclosure, a distance from the thermal deformable material to an incident end of the lens assembly is defined as a formula:

$$a \geq 0.1L, \quad \text{Formula 2:}$$

wherein a is the distance from the thermal deformable material to the incident end of the lens assembly, and L is a length of the lens barrel.

In accordance with an embodiment of the present disclosure, a length of the thermal deformable material is defined as a formula:

$$0.9L \geq b \geq 0.1L, \quad \text{Formula 3:}$$

wherein b is the length of the thermal deformable material, and L is a length of the lens barrel.

In accordance with an embodiment of the present disclosure, a distance is from the thermal deformable material to an emergent end of the lens assembly is defined a formula:

$$0.5L \geq c \geq 0, \quad \text{Formula 4:}$$

wherein c is the distance is from the thermal deformable material to the emergent end of the lens assembly, and L is a length of the lens barrel.

In accordance with an embodiment of the present disclosure, a cross-section of the lens barrel is a circle, a square, a rectangular, or an irregular shape.

In accordance with an embodiment of the present disclosure, the thermal deformable material is formed into a sleeve or in a tube shape.

In summary, in accordance with an embodiment of the present disclosure, the camera module includes the thermal deformable material filled in a gap between the lens barrel and the holder, (1) preventing the lens barrel and the holder from trembling during the transportation process, (2) blocking dust from entering the gap between the lens barrel and the holder, and (3) allowing the adjustment of the lens barrel with respect to the holder during the focus adjusting process, due to the flexibility of the thermal deformable material. Moreover, (4) the layer of the thermal deformable material separates the lens barrel from the dispensed glue. Therefore, after the lens barrel and the holder are fixed by the glue, if the re-adjustment between the lens barrel and the holder is desired due to the unsatisfied focus adjustment result, the lens barrel can still be disassembled from the holder by simply removing the layer of the thermal deformable material from the lens barrel without damaging the lens barrel, and then rewrapping the thermal deformable material around the lens barrel for the next round of assembling steps. Therefore, rework and saving costs are both achieved.

BRIEF DESCRIPTION OF DRAWINGS

The foregoing aspects and many of the attendant advantages of this disclosure will become more readily appreciated as the same becomes better understood by reference to the following detailed description, when taken in conjunction with the accompanying drawings, wherein.

DETAILED DESCRIPTION OF PREFERRED EMBODIMENTS

Figure 1:
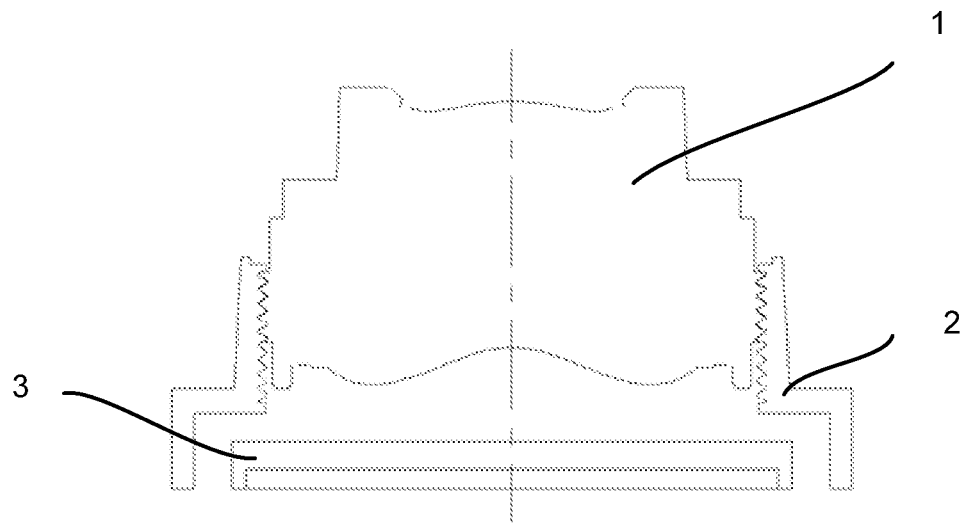
FIG. 1 is a cross-sectional side view illustrating a conventional camera module, wherein a lens barrel and a holder are combined in a thread engagement manner as a screw and a nut.
Figure 2:
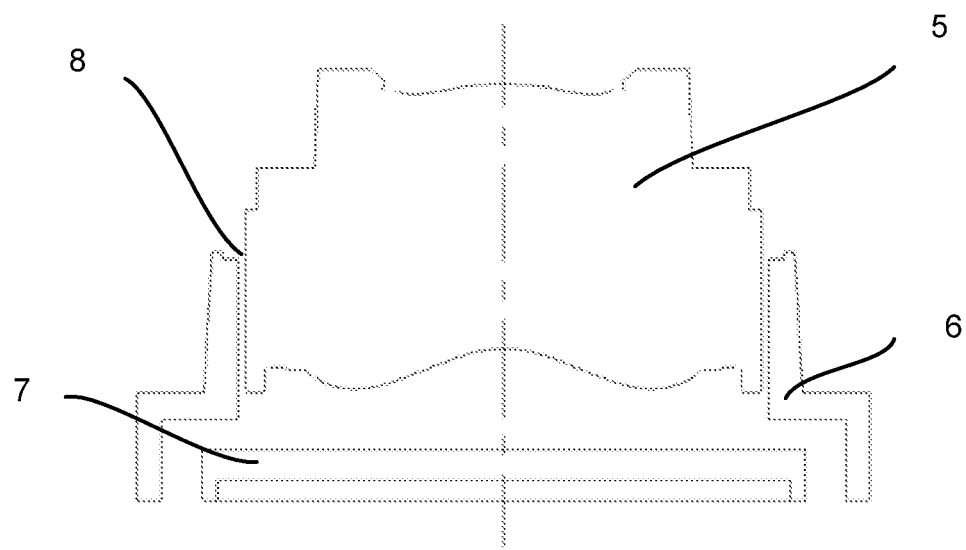
FIG. 2 is a cross-sectional side view illustrating a conventional camera module, wherein a lens barrel and a holder are combined in a threadless manner.

The following description of the embodiments with reference to the accompanying drawings is used to illustrate particular embodiments of the present disclosure. The directional terms used in the present disclosure, such as "upper", "lower", "front", "back", "left", "right", "inner", "outer", "side surface", etc., are only directions with regard to the accompanying drawings. Therefore, the directional terms used for describing and illustrating the present disclosure are not intended to limit the present disclosure.

In the drawings, units with similar structures are indicated by the same reference number.

As to an "embodiment" mentioned herein, the particular features, structures, or characteristics described in this embodiment, which may be described in combination with the embodiment, may be included in at least one embodiment of the present disclosure. The phrases appearing at various locations in the specification do not necessarily refer to the same embodiments, nor to the embodiments being alternative to, mutually exclusive with, or independent from other embodiments. It is explicitly and implicitly understood by a person of ordinary skill in the art that the embodiments described herein may be combined with other embodiments.

The content of the present disclosure is described in detail by reference to embodiments below in conjunction with the accompanying drawings.

Figure 3:
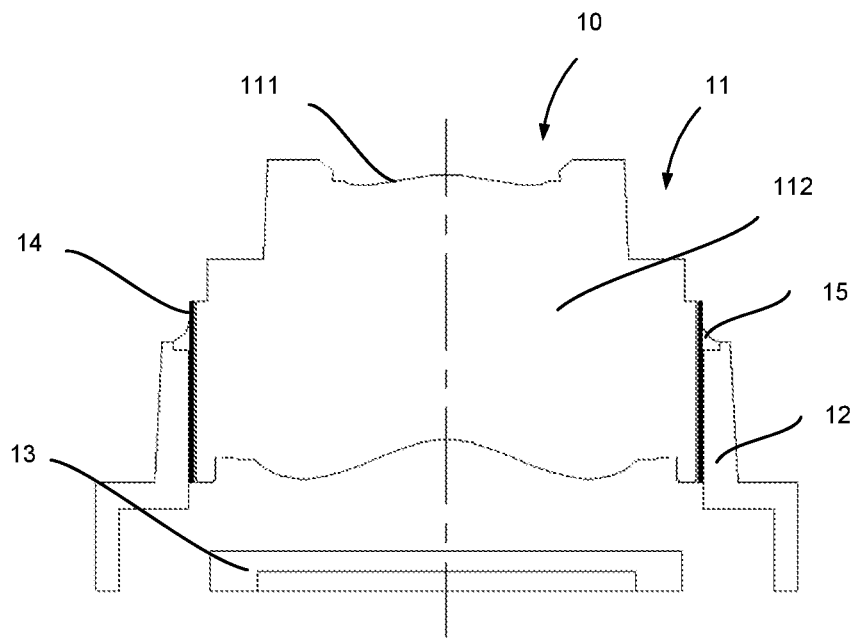
FIG. 3 is a cross-sectional side view illustrating a camera module in accordance with an embodiment of the present disclosure, wherein a lens barrel and a holder are combined via a thermal deformable material disposed between the lens barrel and the holder.

By reference to the accompanying drawings, the technological content and embodiments of the present disclosure are described in detail as follows:

Refer to FIG. 3, which is a cross-sectional side view illustrating a camera module 10 in accordance with an embodiment of the present disclosure, wherein a lens barrel 112 and a holder 12 are combined via a thermal deformable material 14 disposed between the lens barrel 11 and the holder 12.

In accordance an aspect of the present disclosure, the camera module 10 includes a lens assembly 11, the holder 12, and the thermal deformable material 14. The lens assembly 11 includes at least one lens 111 and the lens barrel 112, wherein the lens barrel 112 includes a wall surrounding a central axis of the lens assembly 11 to define a receiving chamber, and the lens 111 is disposed in the receiving chamber. The holder 12 surrounds the lens barrel 112 and supports the lens assembly 11. The thermal deformable material 14 is disposed between an outer wall of the lens barrel 112 and an inner wall of the holder 12. In accordance with an embodiment of the present disclosure, the thermal deformable material 14 is formed into a sleeve or in a tube shape. Herein, the sleeve or the tube is also referred to as a thermal deformable material sleeve 14, or a thermal deformable material tube 14.

In accordance with a preferred embodiment of the present disclosure, the thermal deformable material 14 directly contacts the outer wall of the lens barrel 112 and the inner wall of the holder 12. In accordance with a preferred embodiment of the present disclosure, no space is between the thermal deformable material sleeve 14 and the outer wall of the lens barrel 112, and no space is between the thermal deformable material sleeve 14 and the inner wall of the holder 12. In accordance with a preferred embodiment of the present disclosure, no other component is between the thermal deformable material sleeve 14 and the outer wall of the lens barrel 112, and no other component is between the thermal deformable material sleeve 14 and the inner wall of the holder 12.

In a specific embodiment of the present disclosure, the outer wall of the lens barrel 112 is wrapped by the thermal deformable material 14, which is a flexible soft material, can be easily processed, and easily shrinks and deforms after being heated. This thermal deformable material 14 is filled in the gap between the lens barrel 112 and the holder 12, so that the combination is not separated when being transported, and dust is blocked from entering the gap. Moreover, due to its soft nature, the lens barrel 112 and the holder 12 can be adjusted with respect to each other during the focus adjusting process.

In accordance with an embodiment of the present disclosure, the camera module 10 further includes glue 15 for fixing the holder 12 and the lens barrel 112. In an embodiment, the glue 15 is dispensed between the holder 12 and the thermal deformable material sleeve 14. In a specific embodiment, the glue 15 is dispensed onto a distal end of the holder 12 for connecting the holder 12 with the thermal deformable material sleeve 14.

After the lens barrel 112 and the holder 12 are fixed by the glue 15, if the re-adjustment between the lens barrel 112 and the holder 12 is desired due to the unsatisfied focus adjustment result, the lens barrel 112 can still be disassembled from the holder 12 by simply removing the layer of the thermal deformable material sleeve 14 from the lens barrel 112 without damaging the lens barrel 112, and then rewrapping the thermal deformable material around the lens barrel for the next round of assembling steps. Therefore, rework and saving costs are both achieved.

In accordance with an embodiment of the present disclosure, the thermal deformable material is selected from a group consisting of polyethylene (PE), polyethylene terephthalate (PET), polyvinyl chloride (PVC), polyvinylidene difluoride (PVDF), rubber, and the like.

In an embodiment of the present disclosure, the camera module 10 further includes an image sensor 13. The image sensor 13 is positioned near an emergent surface of the lens assembly 11 and configured for receiving the optical image of the object formed by the lenses 111. In some embodiments, the image sensor 13 may be a charged-coupled device (CCD), or a complementary metal-oxide-semiconductor transistor (CMOS). The image sensor 13 is configured to convert light signals into electrical signals. The image sensor 13 is one selected from the group consisting of a ceramic leaded chip carrier package type image sensor, a plastic leaded chip carrier package type image sensor and a chip scale package type image sensor. However, various types of the image sensors 13 are only examples, and should not be regarded as limiting.

In accordance with an aspect of the present disclosure, a portable device, such as a smart phone, a smart watch, a tablet, a laptop, etc, is provided, including the aforementioned camera module 10.

Figure 4:
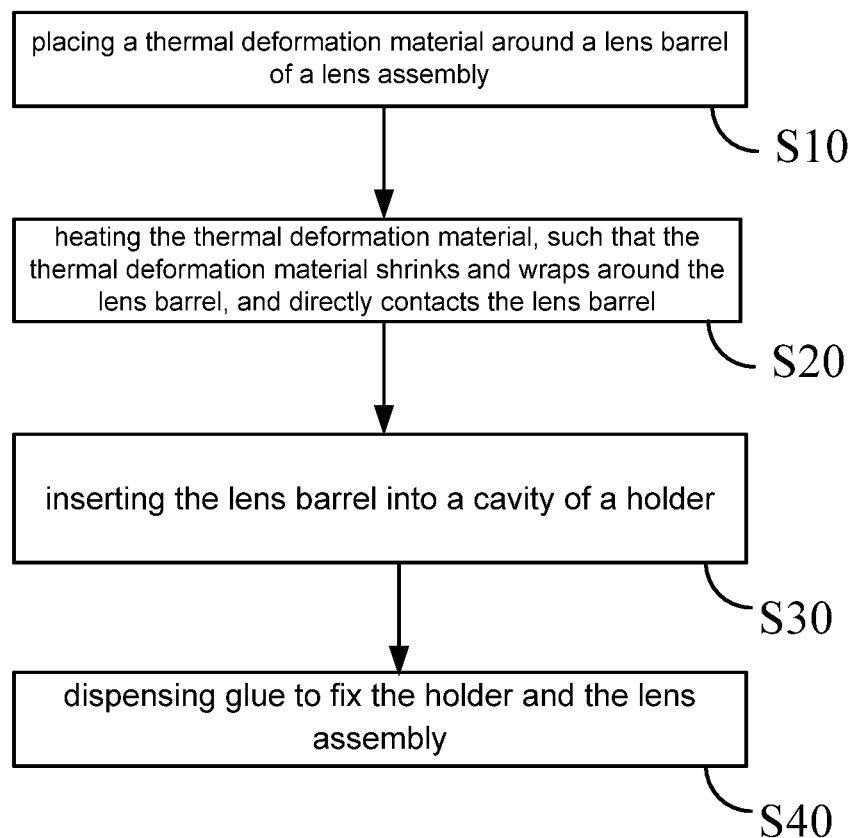
FIG. 4 is a flowchart illustrating steps of a method for assembling a camera module in accordance with an embodiment of the present disclosure.

Refer to FIG. 4, which is a flowchart illustrating steps of a method for assembling a camera module 10 in accordance with an embodiment of the present disclosure. Moreover, refer to FIG. 5 and FIG. 6, which include cross-sectional side views and top views illustrating arrangements of a thermal deformable material 14 before and after being heated in a method for assembling the cameral module 10 in accordance with an embodiment of the present disclosure.

The method for assembling the camera module 10 includes step 10, step 20, and step 30.

In step 10, the thermal deformable material 14 is placed around a lens barrel 112 of a lens assembly 11. In some embodiments, there is a space between the thermal deformable material 14 and the lens barrel 112. As shown in FIG. 4, the thermal deformable material 14 is placed around the lens barrel 112 and is kept at an interval distance from the lens barrel 112. In accordance with an embodiment of the present disclosure, the thermal deformable material 14 is formed into a sleeve or in a tube shape. Herein, the sleeve or the tube is also referred to as a thermal deformable material sleeve 14, or a thermal deformable material tube 14.

Figures 5, 6:
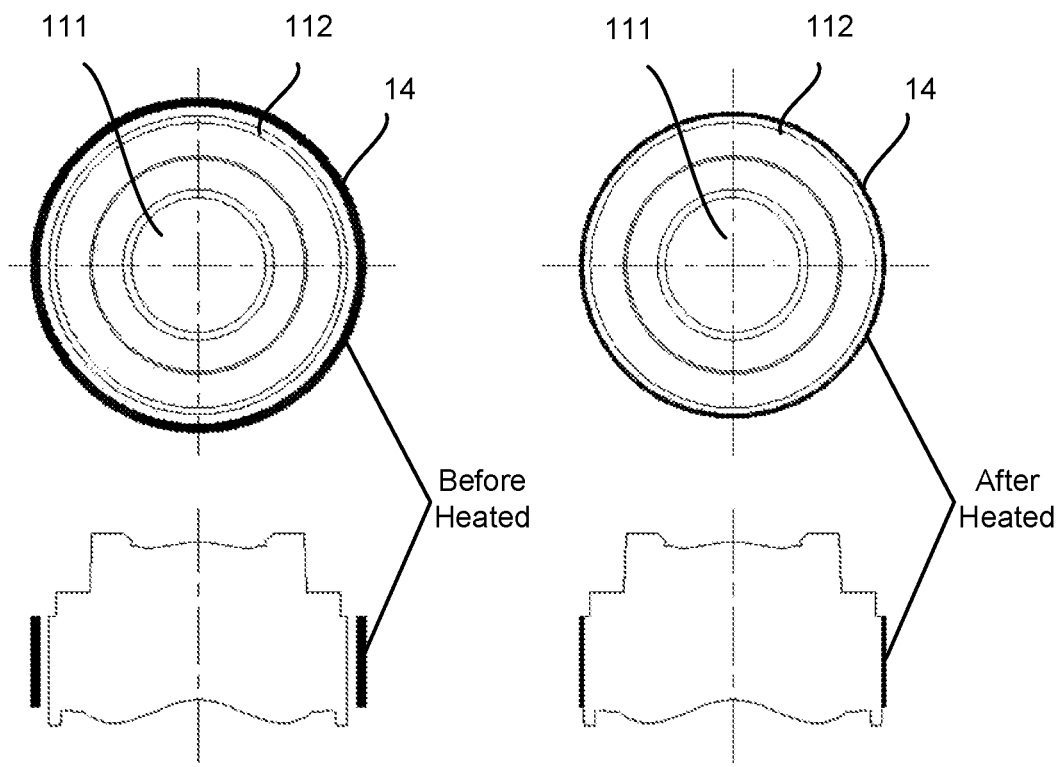
FIG. 5 is a cross-sectional side view and a top view illustrating an arrangement of a thermal deformable material before being heated in a method for assembling the cameral module in accordance with an embodiment of the present disclosure.
FIG. 6 is a cross-sectional side view and a top view illustrating an arrangement of a thermal deformable material after being heated in a method for assembling the cameral module in accordance with an embodiment of the present disclosure.

In step 20, the thermal deformable material 14 is heated, such that the thermal deformable material 14 shrinks, and wraps around the lens barrel 112, and directly contacts the lens barrel 112. As shown in FIG. 5, in an embodiment, after the lens barrel 112 is placed in the middle of the thermal deformable material 14, the material 14 is heated, and then shrinks to tightly wrap the lens barrel 112. The thermal deformable material 14 covers an outer wall of the lens barrel 112 to form an outer layer on the lens barrel 112. In a preferred embodiment, after the step 20 of heating the thermal deformable material, the thermal deformable material directly contacts the outer wall of the lens barrel 112, and no space is between the thermal deformable material 14 and the outer wall of the lens barrel 112.

In step 30, the lens barrel 112 inserted into a cavity of the holder 12. In a preferred embodiment, after the step 30 of inserting the lens barrel 112 into the cavity of the holder 12, the thermal deformable material 14 directly contacts an inner wall of the holder 12, and no space is between the thermal deformable material 14 and the inner wall of the holder 12. In an embodiment, the lens barrel 112 is pre-assembled with the holder 12, and transported. Moreover, the thermal deformable material 14 can also be simply peeled off without affecting the lens barrel 112 and the lens 111 inside.

In accordance with an embodiment of the present disclosure, the method for assembling the camera module 10 further includes a step 40 of dispensing glue 15 to fix the holder 12 and the lens assembly 112. In an embodiment, the glue 15 is dispensed between the holder 12 and the thermal deformable material sleeve 14. In a specific embodiment, the glue 15 is dispensed onto a distal end of the holder 13 for connecting the holder 12 with the thermal deformable material sleeve 14.

Figure 7:
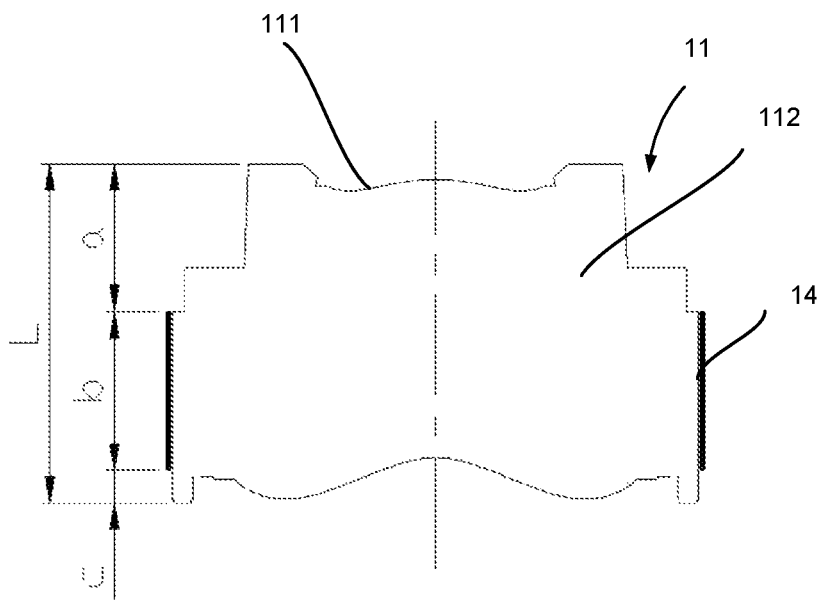
FIG. 7 is a cross-sectional side view illustrating a relationship between a length of a lens barrel and a length of a thermal deformable material in a camera module in accordance with an embodiment of the present disclosure.

Refer to FIG. 7, which is a cross-sectional side view illustrating a relationship between a length of the lens barrel 112 and a length of a thermal deformable material 14 in the camera module 10 in accordance with an embodiment of the present disclosure. A length L of the lens barrel 112 and a length b of the outer thermal deformable material 14 can be described by the following formula:

$$L=a+b+c, \qquad \text{Formula 1:}$$

wherein L is the length of the lens barrel 112, a is a distance from the thermal deformable material 14 to an incident end of the lens assembly 11, b is the length of the thermal deformable material 14, and c is a distance is from the thermal deformable material 14 to an emergent end of the lens assembly 11.

In accordance with an embodiment of the present disclosure, a distance from the thermal deformable material 14 to an incident end of the lens assembly 11 is defined as a formula:

$$a \geq 0.1L, \qquad \text{Formula 2:}$$

wherein a is the distance from the thermal deformable material 14 to the incident end of the lens assembly 11, and L is the length of the lens barrel 112. Specifically, a is a distance from a front end or a distal end of the lens barrel 112 (the optical incident surface facing objects) to a front edge of the material 14. Since the front end of the lens barrel 112 is in contact with other parts, a small gap is reserved to avoid interference.

In accordance with an embodiment of the present disclosure, a length of the thermal deformable material 14 is defined as a formula:

$$0.9\,L \geq b \geq 0.1\,L, \qquad \text{Formula 3:}$$

wherein b is the length of the thermal deformable material, and L is the length of the lens barrel 112. Specifically, the length of the thermal deformable material sleeve 14 with respect to the length of the lens barrel 112 is determined by the shape of the lens barrel 112.

In accordance with an embodiment of the present disclosure, a distance is from the thermal deformable material to an emergent end of the lens assembly is defined a formula:

$$0.5L \geq c \geq 0, \qquad \text{Formula 4:}$$

wherein c is the distance is from the thermal deformable material to the emergent end of the lens assembly, and L is the length of the lens barrel 112. Specifically c is a distance from a rear end or a proximal end of the lens barrel 112 (the optical emergent surface facing images) to a rear edge of the material 14. A gap is reserved at the rear end of the lens barrel 112 to avoid interference with the holder 12 during the focus adjusting process.

Figure 8:
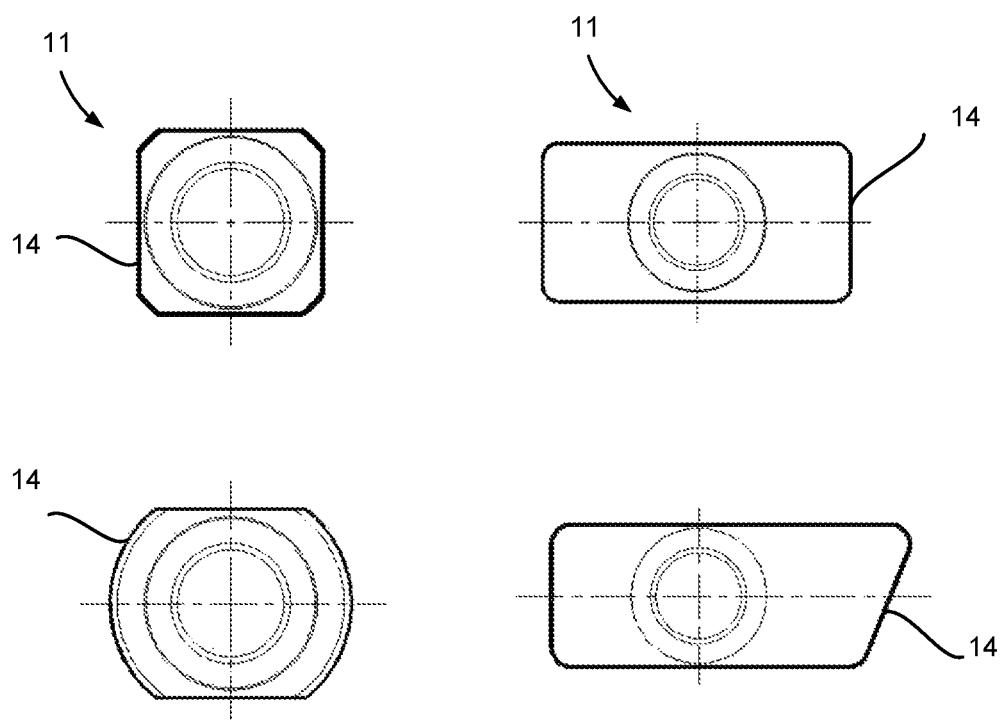
FIG. 8 is a top view illustrating lens barrels and thermal deformable materials surrounding the lens barrel in a camera module in accordance with an embodiment of the present disclosure.

Refer to FIG. 8, which is a top view illustrating the lens barrels 112 and the thermal deformable materials 14 surrounding the lens barrel 112 in the camera module 10 in accordance with an embodiment of the present disclosure.

As shown in FIG. 8, a cross-section of the lens barrel is a circle, a square, a rectangular, or an irregular shape. That is, the lens barrel 112 is in a cylindrical shape, a square column shape, a rectangular column shape, or an irregular column shape. In the present invention, the thermal deformable material 14 can be applied to the lens barrels 112 in the aforementioned shapes, and realizes the camera module 10 of the present disclosure.

In summary, in accordance with an embodiment of the present disclosure, the camera module includes the thermal deformable material filled in a gap between the lens barrel and the holder, (1) preventing the lens barrel and the holder from trembling during the transportation process, (2) blocking dust from entering the gap between the lens barrel and the holder, and (3) allowing the adjustment of the lens barrel with respect to the holder during the focus adjusting process, due to the flexibility of the thermal deformable material. Moreover, (4) the layer of the thermal deformable material separates the lens barrel from the dispensed glue. Therefore, after the lens barrel and the holder are fixed by the glue, if the re-adjustment between the lens barrel and the holder is desired due to the unsatisfied focus adjustment result, the lens barrel can still be disassembled from the holder by simply removing the layer of the thermal deformable material from the lens barrel without damaging the lens barrel, and then rewrapping the thermal deformable material around the lens barrel for the next round of assembling steps. Therefore, rework and saving costs are both achieved.

The present disclosure has been described with a preferred embodiment thereof and it is understood that various modifications, without departing from the spirit of the present disclosure, are in accordance with the embodiments of the present disclosure. Hence, the embodiments described are intended to cover the modifications within the scope and the spirit of the present disclosure, rather than to limit the present disclosure.

In summary, although the preferable embodiments of the present disclosure have been disclosed above, the embodiments are not intended to limit the present disclosure. A person of ordinary skill in the art, without departing from the spirit and scope of the present disclosure, can make various modifications and variations. Therefore, the scope of the disclosure is defined in the claims.

What is claimed is:

1. A camera module, comprising:
   a lens assembly including at least one lens and a lens barrel, wherein the lens barrel includes a wall surrounding a central axis of the lens assembly to define a receiving chamber, and the lens is disposed in the receiving chamber;
   a holder surrounding the lens barrel and supporting the lens assembly; and
   a thermal deformable material disposed between an outer wall of the lens barrel and an inner wall of the holder, wherein a first surface of the thermal deformable material facing the outer wall of the lens barrel directly contacts the outer wall of the lens barrel, a second surface of the thermal deformable material facing the inner wall of the holder directly contacts the inner wall of the holder, no space is between the thermal deformable material and the outer wall of the lens barrel, and no space is between the thermal deformable material and the inner wall of the holder.

2. The camera module as claimed in claim 1, further comprising glue fixing the holder and the lens assembly.

3. The camera module as claimed in claim 1, wherein the thermal deformable material is selected from a group consisting of polyethylene (PE), polyethylene terephthalate (PET), polyvinyl chloride (PVC), polyvinylidene difluoride (PVDF), and rubber.

4. The camera module as claimed in claim 1, wherein a distance from a projection point of an incident end of the thermal deformable material projected on the central axis to a projection point of the incident end of the lens assembly projected on the central axis is defined as a formula:

$$a \geq 0.1L,$$

wherein a is the distance from the projection point of the incident end of the thermal deformable material projected on the central axis to the projection point of the incident end of the lens assembly projected on the central axis, and L is a length of the lens barrel.

5. The camera module as claimed in claim 1, wherein a length of the thermal deformable material is defined as a formula:

$$0.9L \geq b \geq 0.1L,$$

wherein b is the length of the thermal deformable material, and L is a length of the lens barrel.

6. The camera module as claimed in claim 1, wherein a distance is from a projection point of an emergent end of the thermal deformable material projected on the central axis to a projection point of the emergent end of the lens assembly projected on the central axis is defined a formula:

$$0.5L \geq c \geq 0,$$

wherein c is the distance is from the projection point of the emergent end of the thermal deformable material projected on the central axis to the projection point of the emergent end of the lens assembly projected on the central axis, and L is a length of the barrel.

7. The camera module as claimed in claim 1, wherein a cross-section of the lens barrel is a circle, a square, or a rectangular.

8. The camera module as claimed in claim 1, wherein the thermal deformable material is formed into a sleeve or in a tube shape.

9. A portable device comprising the camera module as claimed in claim 1.

10. A method for assembling a camera module, comprising:
    a step (10) of placing a thermal deformable material around a lens barrel of a lens assembly;
    a step (20) of heating the thermal deformable material, such that the thermal deformable material shrinks and wraps around the lens barrel, and directly contacts the lens barrel; and
    a step (30) of inserting the lens barrel into a cavity of a holder, wherein after the step (20) of heating the thermal deformable material, the thermal deformable material directly contacts the outer wall of the lens barrel, and no space is between the thermal deformable material and the outer wall of the lens barrel; and
    after the step (30) of inserting the lens barrel into the cavity of the holder, the thermal deformable material directly contacts an inner wall of the holder, and no space is between the thermal deformable material and the inner wall of the holder.

11. The method for assembling the camera module as claimed in claim 10, further comprising a step (40) of dispensing glue to fix the holder and the lens assembly.

12. The method for assembling the camera module as claimed in claim 10, wherein the thermal deformable material is selected from a group consisting of polyethylene (PE), polyethylene terephthalate (PET), polyvinyl chloride (PVC), polyvinylidene difluoride (PVDF), and rubber.

13. The method for assembling the camera module as claimed in claim 10, wherein a projection point of an incident end of the thermal deformable material projected on a central axis to a projection point of the incident end of the lens assembly projected on the central axis is defined as a formula:

$$a \geq 0.1L,$$

wherein a is the distance from the projection point of the incident end of the thermal deformable material projected on the central axis to the projection point of the incident end of the lens assembly projected on the central axis, and L is a length of the lens barrel.

14. The method for assembling the camera module as claimed in claim 10, wherein a length of the thermal deformable material is defined as a formula:

$$0.9L \geq b \geq 0.1L,$$

wherein b is the length of the thermal deformable material, and L is a length of the lens barrel.

15. The method for assembling the camera module as claimed in claim 10, wherein a projection point of an emergent end of the thermal deformable material projected on a central axis to a projection point of the emergent end of the lens assembly projected on the central axis is defined a formula:

$$0.5L \geq c \geq 0,$$

wherein c is the distance is from the projection point of the emergent end of the thermal deformable material projected on the central axis to the projection point of the emergent end of the lens assembly projected on the central axis, and L is a length of the barrel.

16. The method for assembling the camera module as claimed in claim 10, wherein a cross-section of the lens barrel is a circle, a square, or a rectangle.

17. The method for assembling the camera module as claimed in claim 10, wherein the thermal deformable material is formed into a sleeve or in a tube shape.

* * * * *